Figure 1:
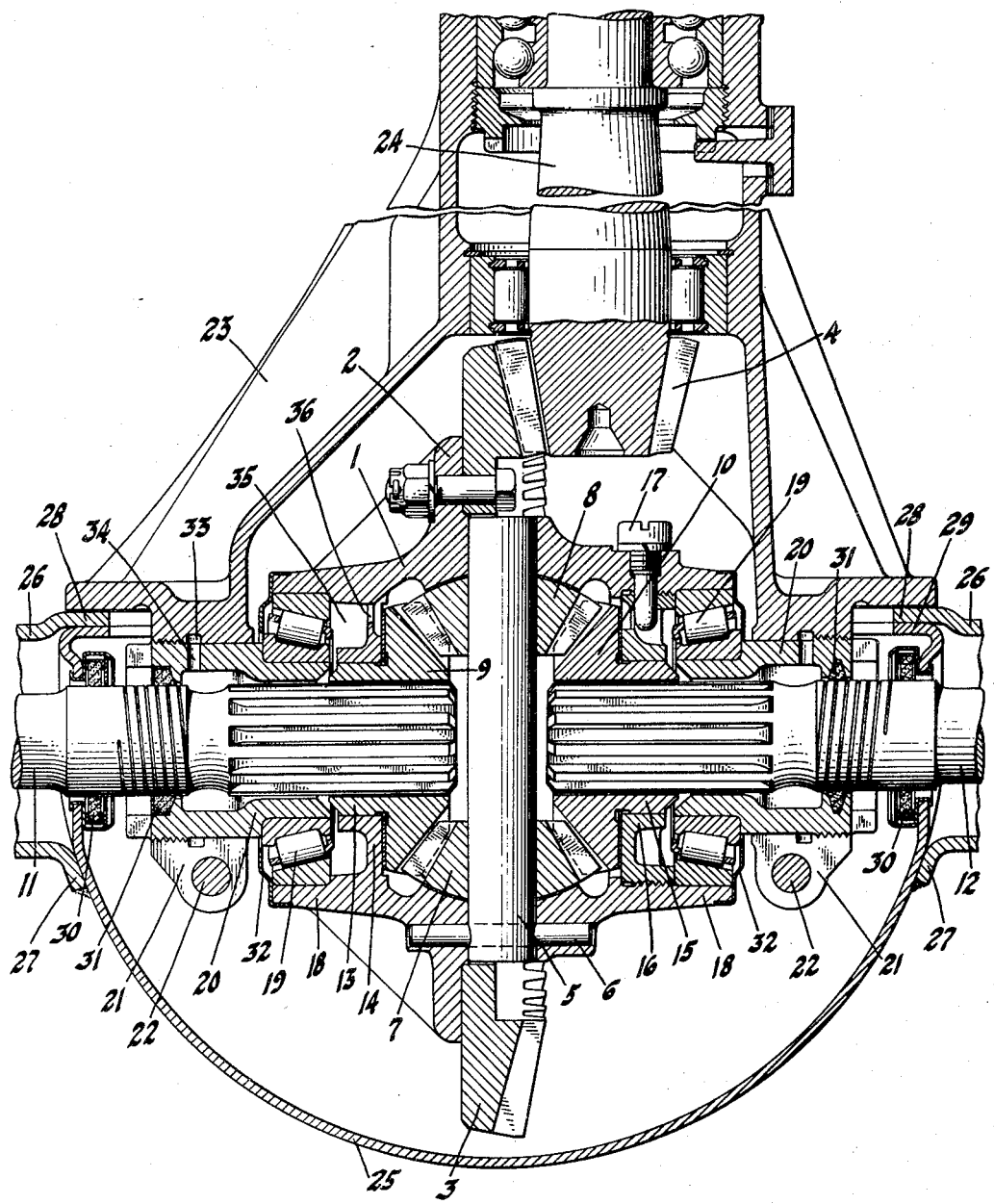

Nov. 17, 1936.  G. L. ROTHROCK  2,061,009
REAR AXLE CONSTRUCTION
Filed Nov. 24, 1934   2 Sheets-Sheet 1

Inventor
George L. Rothrock
By Blackmore, Sparrow & Flint
Attorneys

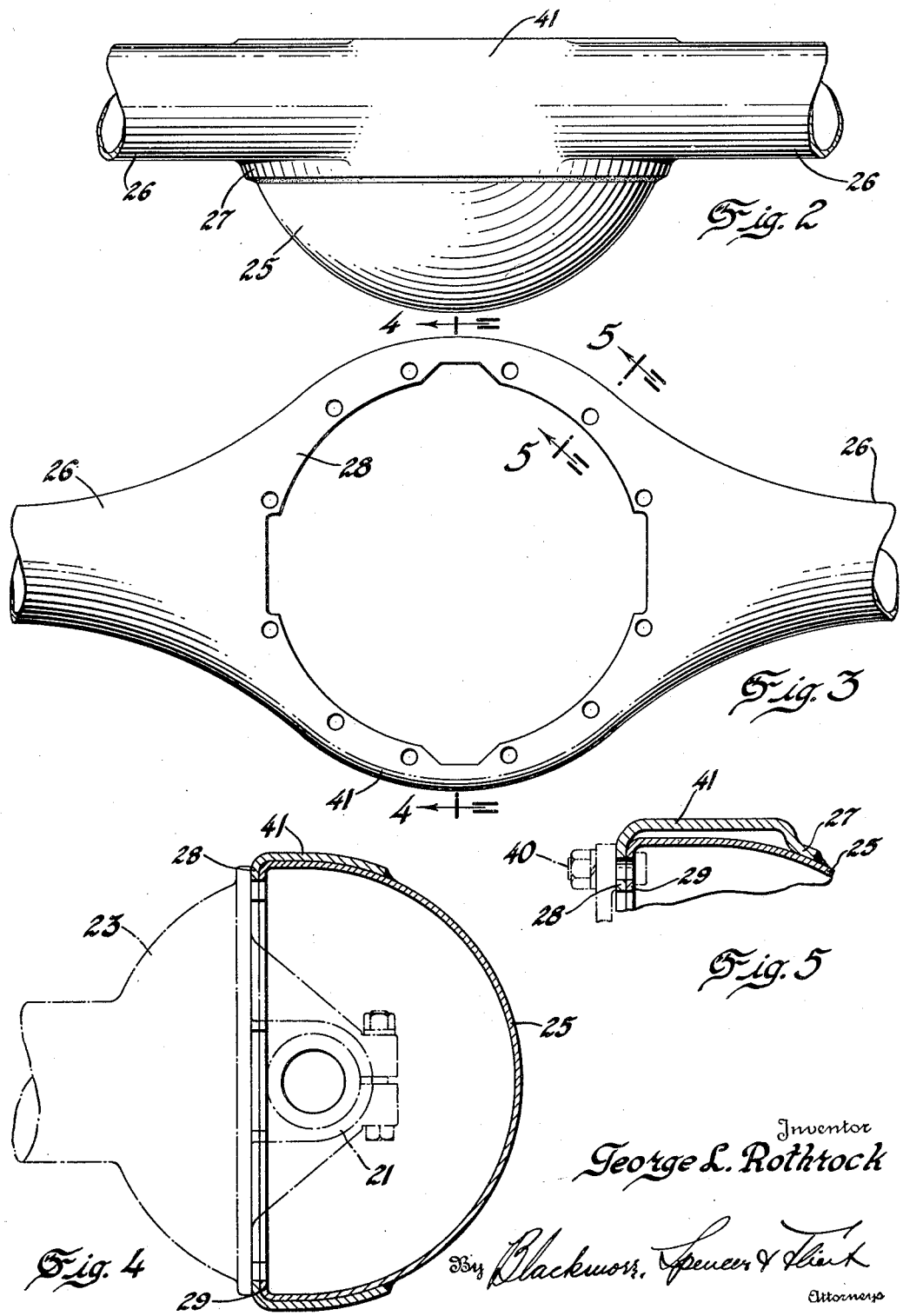

Patented Nov. 17, 1936

2,061,009

UNITED STATES PATENT OFFICE 2,061,009

REAR AXLE CONSTRUCTION

George L. Rothrock, Highland Park, Mich., assignor to General Motors Corporation, Detroit, Mich., a corporation of Delaware Application November 24, 1934, Serial No. 754,580

6 Claims. (Cl. 74—311)

This invention relates to improvements in driving axles for motor vehicles.

One of the objects of the invention is to provide an assembly possessing exceptional ruggedness and one wherein the parts are arranged better to withstand and take care of operating stresses and forces, particularly as regards high speed and heavy load, and to transmit power with minimum loss, with a resulting long life and the absence of attention and expense during use.

Specifically there is contemplated a structure wherein the casing elements that enclose the differential mechanism and axle shafts are shaped and joined together in a manner to lend mutual reinforcement to each other with a removable cover that carries as a unit therewith the differential assembly, including a one piece cage devoid of the usual weak spots and openings, and arranged to receive differential gearing through one end and to be rotatably supported at opposite ends through a large area of bearing surface upon the removable carrier. The one piece cage is of special importance because it not only simplifies manufacture and materially reduces cost, but more particularly affords a device of great inherent rigidity as compared with the conventional medially split cage, the sections of which are separately formed and then weakened by cutting away portions thereof at a large number of places to provide the necessary attachment holes and lubrication openings.

The advantages and meritorious features of the invention will be appreciated upon an examination of the structure itself as shown in the accompanying drawings, wherein Figure 1 is a horizontal sectional view of the drive axle structure embodying the invention; Figure 2 is a plan view of the axle housing with the differential carrier removed; Figure 3 is a front elevation of the axle housing shown in Figure 2, and Figures 4 and 5 are sectional views taken on line 4—4 and on line 5—5, respectively, of Figure 3.

In the drawings the numeral 1 indicates a substantially cylindrical one piece cage or barrel provided intermediate its ends with a peripheral flange 2 for mounting the ring gear 3 in mesh with the pinion gear 4. A pin 5 extending diametrically across the interior of the cage and being held in place by a retainer stud 6, mounts a pair of bevel gears 7 and 8, each engaging for differential driving action, both of the gears 9 and 10 splined on the ends of axle shaft sections 11 and 12, respectively. An annular extension 13 on the side gear 9 is rotatably supported in the inwardly extending end wall 14 of the cage, while a similar extension 15 on the gear 10 is mounted in the end wall 16 removably threaded within the cage and locked by the stud 17. Beyond each end wall, an axial extension 18 at the periphery of the cage provides a shouldered seat of large internal diameter for the outer race of a tapered roller bearing assembly 19.

A large bearing surface is thus afforded for the rotatable cage and the two sets of rollers being tapered in opposite directions resist axial thrusts. Attention is directed also to the fact that each inclined bearing surface extends substantially normal to the direction of rocking movement which tends to occur during cage rotation as a result of toothed driving engagement of the pinion and ring gear.

The differential gears are inserted within the cage as an initial sub-assembly. After the parts are properly formed, which includes machining the cage interior through the open end thereof normally closed by the ring 16, the gears 7–10 are introduced in proper succession through the open end of the cage which is then closed by the ring or removable end wall 16 and associated bearing assembly 19, the outside diameters of both being sufficiently great that the space provided therefor in the open end of the cage permits passage of the gears.

Each roller assembly has its inner race positioned on a shouldered seat of an axially adjustable sleeve 20 coaxial with the axle shafts. The two sleeves are mounted in threaded engagement within split eyes 21, and clamp studs 22 serve to contract the eyes for holding the sleeves in adjusted positions. The eyes 21 project in spaced relation from the carrier 23, which also affords a mounting for the drive pinion shaft 24. The carrier thus provides a sub-assembly unit with the differential mechanism and after it is positioned in place, the shaft sections 11 and 12 may be introduced axially through the sleeves 20 into splined engagement with the differential side gears.

The differential carrier acts also as a cover plate for the differential casing of the axle housing and is secured by bolts 40, over an opening in the forward wall of the housing. The differential casing is formed, in cooperation with the carrier, by a sheet metal pressing or pan 25, for convenience and strength of part spherical shape, which surrounds the differential and extends forwardly of the axis thereof across the enlarged or expanded central ring 41 connecting the oppositely extending tubes or housings 26 for the axle shaft sections 11 and 12. The rearward edge of the central enlargement 41 is turned outwardly as at 27 into flat seating engagement with the adjacent portion of the pan 26 and is permanently connected thereto by welding or the like, while the forward margin is offset slightly at 28 and welded or otherwise secured to the inturned flange or rim 29 of the pan. By reason of this construction the usual inspection plate is eliminated and the formation of the parts is such that increased rigidity is built into the axle housing. Welding the case in position not only enables it to act as a structural member for greatly reinforcing the assembly, but also effects a saving in manufacturing cost by eliminating several machine operations.

In the opposite side walls of the differential casing 25, openings are made for the passage therethrough of the axle shaft sections and these openings are closed by oil seals 30 which for convenience are illustrated as including a shaft wiping ring enclosed within a sheet metal retainer fixed to the wall of the casing. Inwardly of the seal the shaft section carries a helical oil groove which on shaft rotation tends to work oil away from the seal.

Additional oil seals 31, wiping the shafts, are carried by the sleeves 20 to close off the interior of the differential cage assembly, and oil deflector plates 32 on opposite ends of the cage extend inwardly over the ends of the roller bearings. The lubricating oil or grease contained within the housing is thrown or splashed by the moving parts, particularly the ring gear, and falls into suitable troughs, not shown, that lead into annular grooves 33 interiorly of the supporting eyes 21. From each groove one or more radial openings 34 pass the lubricant to the interior of the fixed sleeve 20 from where it is drawn inwardly by the action of the moving parts through the necessary clearance spaces and into a channel 35 formed in each end wall. Some of the lubricant then reaches the anti-friction bearing adjacent the channel and the remainder goes to the gears interiorly of the cage through the ports 36 in the end walls. Ample lubrication with a minimum supply of lubricant is thus insured but the most important is that the one piece cage is not weakened by cutting away portions as is usual in forming passages to conduct lubricant into the interior thereof.

I claim:

1. A drive axle assembly, including a one piece cage adapted to receive differential gearing through the side thereof and provided with annular projections at both sides to receive internally thereof supporting bearing elements, a differential carrier having spaced bearing sleeves extending toward one another and into said projections, a pan-like housing open on one side only for cooperation with said carrier to completely enclose said cage but having shaft openings in opposite sides axially alined with said sleeves and a drive shaft housing including a centrally enlarged ring surrounding said differential housing and a pair of tubular elements extending outwardly from the ring at each side of said shaft openings.

2. A hollow cage for differential gearing comprising as an integral unit, a substantially cylindrical wall extending from end to end of the unit, bearing seats interiorly of the wall at each end thereof, a radially projecting wall spaced axially inwardly from one end to afford a bearing for a differential gear received interiorly of the cylindrical wall through the opposite end thereof and means spaced axially inwardly from the last mentioned end for removably locating a detachable end wall, said last mentioned end of the cylindrical wall being so constructed and arranged as to permit to pass therethrough the differential gearing.

3. In a differential assembly, a one piece cage having a wall substantially tubular in shape, and being adapted to receive differential gearing assembled through an end thereof, means to retain gearing within the one piece cage comprising projections extending interiorly of the tubular wall adjacent opposite ends thereof, at least one of said retaining projections being removable to permit passage of the gearing axially through the end of the cage, and bearing supports interiorly of the tubular wall at the ends of the cage beyond said projections.

4. Differential drive mechanism including a one piece hollow sleeve like member having one end open and through which open end a differential gear set is insertable, an internally projecting wall spaced axially from the opposite end of the sleeve to provide a bearing for one of the gears and define an end of the centrally disposed gear enclosing space, and a removable ring closing the open end of the sleeve and detachably positioned internally of the sleeve and axially from the end thereof to define an end of and to close the gear enclosing space and to provide a bearing for one of the gears, the projecting end portions of the sleeve beyond said fixed wall and removable ring serving to locate the sleeve and receive internally thereof supporting bearing elements.

5. In a live axle construction, a differential, a pair of axle shafts extending outwardly from opposite sides of the differential, means to encase the differential and axle shafts including a housing having a central ring-like enlargement surrounding the differential and a pair of tubular extensions projecting from said ring-like enlargement and enclosing the axle shafts, a pan nested within and permanently secured to the ring-like enlargement to reinforce the same and close one side thereof, the wall of said pan within the ring having axle receiving openings in alinement with said tubular extensions, and a differential carrier removably secured to said central enlargement and closing the other side thereof.

6. In a live axle construction, a pair of axially alined shaft enclosing tubes, having an enlarged connecting ring therebetween, and a closure pan for one side of the ring, said pan having its marginal portion nested within the ring and projected across adjacent ends of said tubes with shaft receiving openings therein in axial alinement with the tubes.

GEORGE L. ROTHROCK.